United States Patent
Steinberg et al.

(10) Patent No.: US 7,109,442 B2
(45) Date of Patent: Sep. 19, 2006

(54) GRILL

(75) Inventors: Howard I. Steinberg, Shelton, CT (US); Michelle Carillo, Norwalk, CT (US); Jill Kreutzer Orent, Westport, CT (US); Amy Geiger, Bridgeport, CT (US); Maria Aljoburi, Shelton, CT (US); Erica Petrow, Fairfield, CT (US); Amy Risinit, Norwalk, CT (US)

(73) Assignee: Conair Corporation, Stamford, CT (US)

( * ) Notice: Subject to any disclaimer, the term of this patent is extended or adjusted under 35 U.S.C. 154(b) by 112 days.

(21) Appl. No.: 10/881,694

(22) Filed: Jun. 30, 2004

(65) Prior Publication Data

US 2005/0005777 A1    Jan. 13, 2005

Related U.S. Application Data

(60) Provisional application No. 60/515,824, filed on Oct. 30, 2004, provisional application No. 60/483,850, filed on Jun. 30, 2003.

(51) Int. Cl.
*A47J 37/06* (2006.01)
*A47J 37/08* (2006.01)
*H05B 3/06* (2006.01)

(52) U.S. Cl. ............. 219/386; 219/524; 99/349; 99/372; 99/375; 99/376; 99/377; 99/378; 99/379

(58) Field of Classification Search ........ None
See application file for complete search history.

(56) References Cited

U.S. PATENT DOCUMENTS

| | | | |
|---|---|---|---|
| 213,763 A | 4/1879 | Lee | |
| 875,972 A | 1/1908 | Wessel | |
| 2,009,791 A * | 7/1935 | Shroyer | 99/377 |
| 2,597,695 A | 5/1952 | Braski et al. | 219/44 |
| 2,785,277 A | 3/1957 | Jepson | 219/44 |
| 2,899,888 A * | 8/1959 | Koci | 99/331 |
| 3,146,692 A * | 9/1964 | Connolly et al. | 99/379 |
| 3,245,337 A * | 4/1966 | White et al. | 99/331 |
| 3,669,006 A * | 6/1972 | Lee, Sr. | 99/450.3 |
| 3,746,837 A * | 7/1973 | Frey et al. | 219/387 |
| 3,848,110 A * | 11/1974 | Giguere et al. | 219/525 |
| 4,150,609 A * | 4/1979 | McClean | 99/372 |
| 4,206,345 A * | 6/1980 | Maass et al. | 219/524 |
| 4,364,308 A * | 12/1982 | John et al. | 99/351 |
| 4,852,545 A | 8/1989 | Sherman et al. | |
| 4,972,766 A | 11/1990 | Anetsberger | |
| D338,132 S | 8/1993 | Chang | D7/356 |
| D381,553 S | 7/1997 | Candianides | D7/356 |
| 5,839,357 A | 11/1998 | Ha et al. | 99/337 |
| 6,024,014 A * | 2/2000 | Kasai | 99/425 |
| 6,100,504 A | 8/2000 | Wagner | 219/432 |
| 6,283,015 B1 | 9/2001 | Kwon et al. | 99/337 |
| 6,389,959 B1 * | 5/2002 | Robertson | 219/386 |
| 6,439,108 B1 | 8/2002 | Wu | |
| 6,608,292 B1 * | 8/2003 | Barnes | 219/730 |
| 6,820,537 B1 * | 11/2004 | Patenotre | 99/331 |

* cited by examiner

*Primary Examiner*—Joseph Pelham
(74) *Attorney, Agent, or Firm*—Lawrence Cruz; Steven A. Garner

(57) ABSTRACT

A grill is provided that has an upper housing having a first heating plate removably connected thereto, a lower housing having a second heating plate removably connected thereto, and an arm FOR connecting to the upper housing at a first pivot point and connecting to the lower housing at a second pivot point.

17 Claims, 13 Drawing Sheets

GRILL

CROSS-REFERENCE TO RELATED APPLICATIONS

This application claims priority to U.S. Provisional Application Ser. No. 60/483,850, filed on Jun. 30, 2003 and 60/515,824 filed Oct. 30, 2004, both of which are incorporated herein by reference in their entirety.

BACKGROUND OF THE INVENTION

1. Field of the Invention

The present invention relates to a food heating device. More particularly, the present invention relates to a grill that cooks food items by grilling the food items.

2. Description of the Related Art

Grills, and in particular electric grills, are known. These devices are generally constructed with heating plates having a particular surface geometry for heating food placed thereon. The heating plates are typically secured to a housing and typically heated by an electrical resistance heater. However, these devices have the disadvantages of being limited to a fixed surface geometry for the heating plate and being difficult to clean since the heating plate is secured to the housing and, thus, containing electrical components therein. Additionally, such devices typically require an extended heat up time because of a thermally inefficient transfer of heat from the heater to the heating plate of the grill.

Additionally, in grills having heating plates that can be moved relative to each other, the heating plates are brought together at a common connection point due to a direct pivotal connection between the heating plates. The direct pivotal connection causes an uneven distribution of heat transferred to the food, and uneven cooking.

SUMMARY OF THE INVENTION

It is an object of the present invention to provide a grill having improved thermal efficiency.

It is another object of the present invention to provide such a grill that evenly distributes heat to the heating plates.

It is still another object of the present invention to provide such a grill that can perform various types of cooking using selectively removable and interchangeable heating plates.

It is yet another object of the present invention to provide such a grill that facilitates removal of the interchangeable heating plates for cleaning.

These and other objects and advantages of the present invention are achieved by a grill having upper and lower housings that can be moved together so that the housings remain parallel to each other. Each of the housings preferably have heaters in thermal contact with heating plates connected to the housing. The heating plates preferably have channels or other structures that increase the surface contact area between the heaters and the heating plates in order to improve heat transfer therebetween. The heaters may be cast directly in the heating plates. Also, the heating plates having embedded heaters are preferably suitably sealed to be waterproof for easy cleaning.

The heating plates are selectively removable and interchangeable with each other. The heating plates preferably have a number of different surface geometries for performing various types of cooking such as, for example, grilling, griddling, waffling, and toasting, as well as other types of cooking. Preferably, the heating plates are selectively connected to the housings by a quick release mechanism that allows a user to quickly and easily remove and/or interchange the heating plates. The heating plates can include a gutter system for draining cooking residue away from the cooking area.

DETAILED DESCRIPTION OF THE INVENTION

Figure 1:
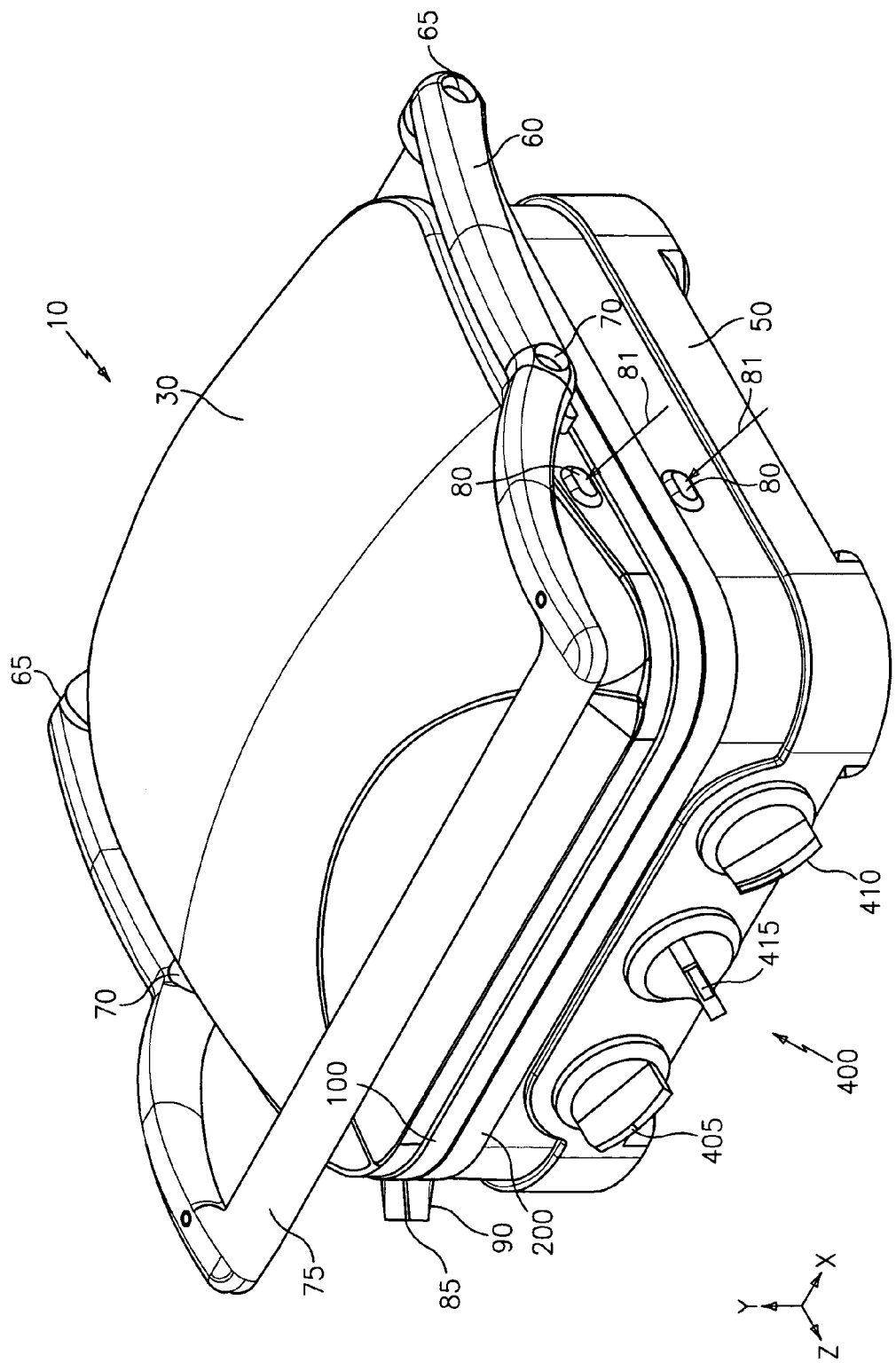
FIG. 1 is a perspective view of a grill in accordance with the present invention.

Referring to the drawings and in particular FIG. 1, there is shown a grill generally represented by reference numeral 10. Grill 10 has an upper housing 30, a lower housing 50 and a securing arm 60.

Securing arm 60 is connected to upper and lower housings 30, 50 to allow the housings to be selectively opened and closed. Preferably, securing arm 60 is pivotally connected to lower housing 50 at rear pivots 65. Securing arm 60 is preferably pivotally connected to upper housing 30 at center pivots 70. In one embodiment, rear pivots 65 are positioned at a rear portion of lower housing 50 and center pivots 70 are positioned at a center area of upper housing 30. By pivotally connecting the upper and lower housings 30, 50 at different areas along securing arm 60, the housings can be moved together for contact grilling so that the upper and lower housings are substantially parallel to each other.

Securing arm 60 preferably has a handle 75 for holding and manipulating the securing arm and lifting the upper housing 30 away from lower housing 50. Preferably, handle 75 is made from a material that facilitates gripping and is substantially thermally isolated from securing arm 60.

Referring to FIGS. 1 through 8, upper and lower housings 30, 50 have upper and lower heating plates 100, 200 removably secured thereto, respectively. Upper and lower heating plates 100, 200 are preferably removably secured to the corresponding upper and lower housings 30, 50. Upper and lower heating plates 30, 50 have release mechanisms operably connected to the housings and the heating plates that allow for a quick release of the heating plates from the grill.

Figure 3:
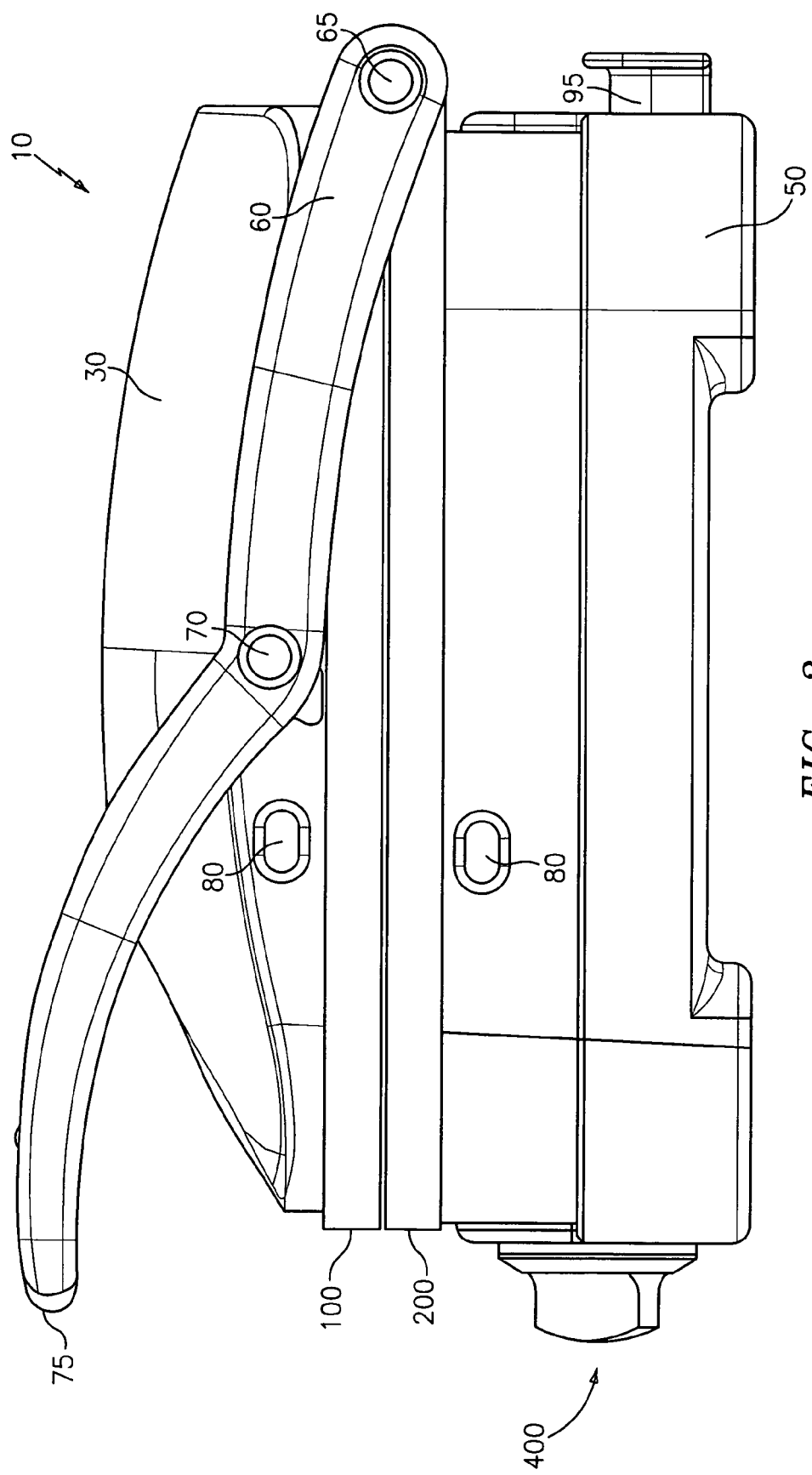
FIG. 3 is a side view of the grill of FIG. 1.
Figure 4:
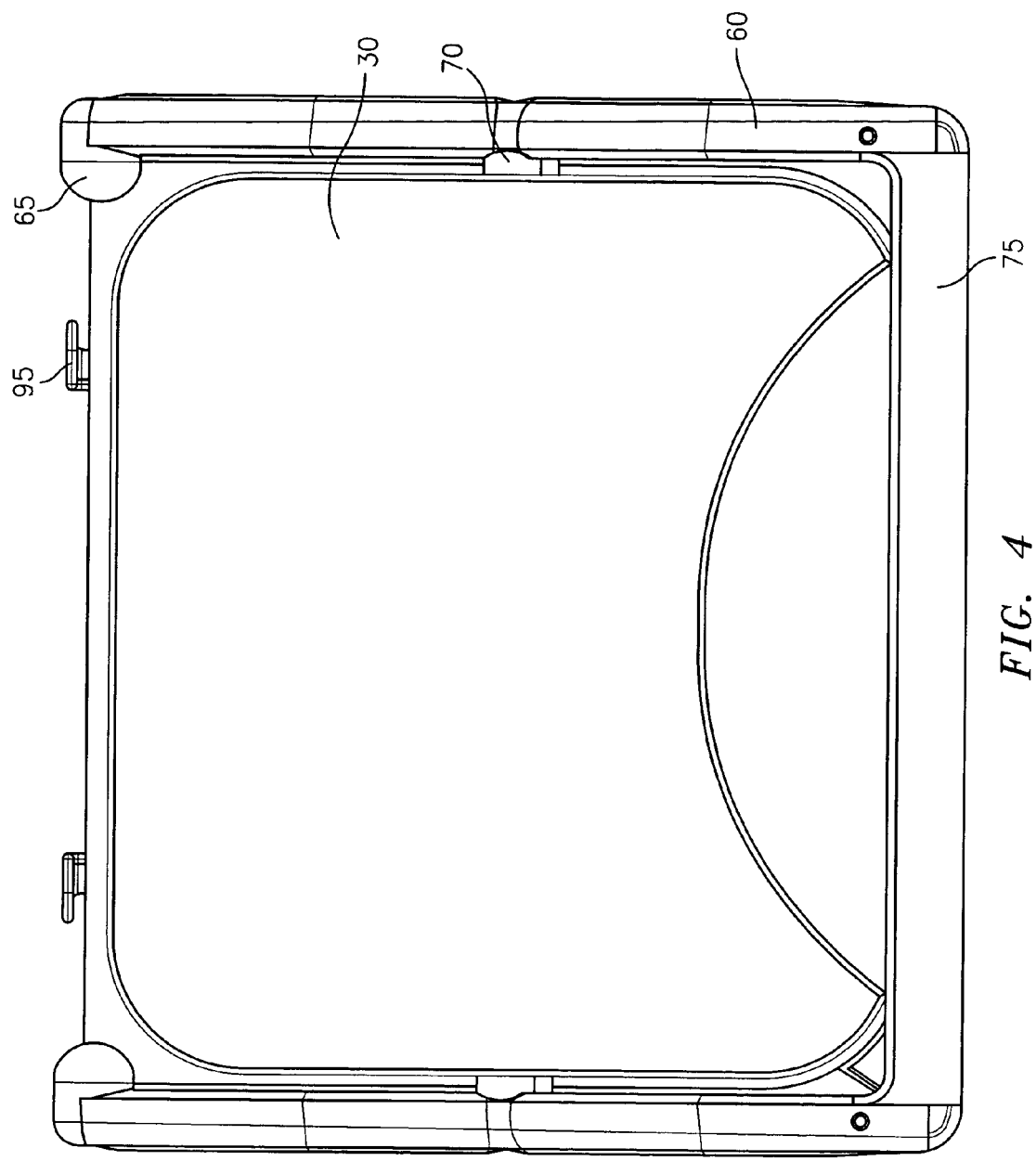
FIG. 4 is a top view of the grill of FIG. 1.
Figure 14:
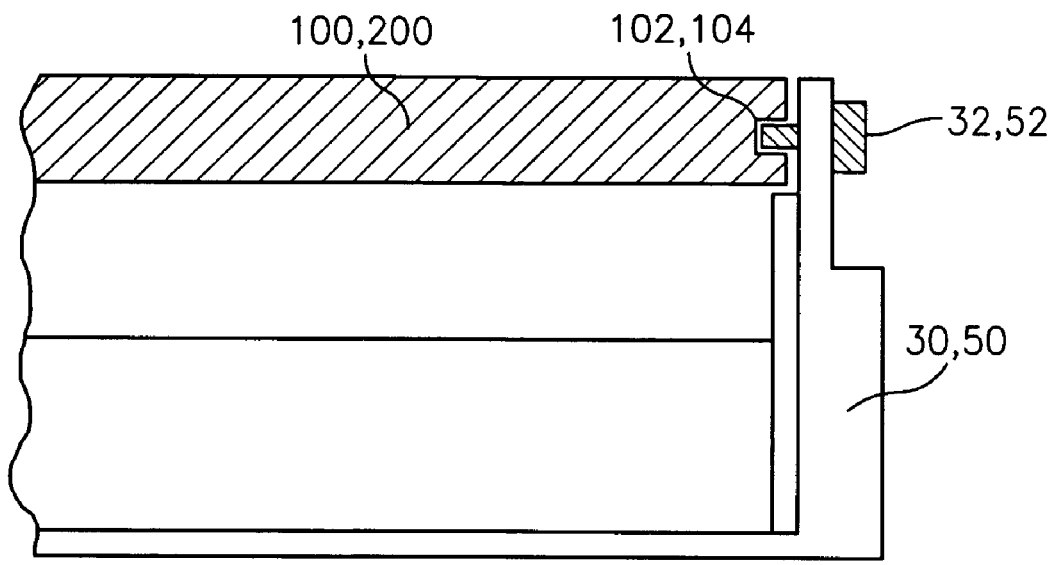
FIG. 14 is a detailed view of a mechanical connection between the heating plate of FIG. 12 and the grill of FIG. 1 in accordance with an embodiment of the present invention.

In another preferred embodiment, grill 10 has slide or otherwise movable latches 80, as shown in FIGS. 1 and 3, that allow a user to easily remove heating plates 100, 200 by pressing actuators of the slide latch in the direction indicated by arrows 81. Removal of heating plates 30, 50 facilitates easy cleaning and interchange of heating plates. Alternative fastening mechanisms can be used to selectively removably connect upper and lower housing 30, 50 to heating plates 100, 200, respectively. For example, retention of heating plates 100, 200 in housings 30, 50 may be facilitated by one or more guide pins 32, 52, as shown in FIG. 14.

The pair of heating plates 100, 200 preferably includes a flat griddle type (FIGS. 5 and 6), a waffle type (FIGS. 7 and 8), and a raised ribbed grill type (not shown). The various types of heating plates are interchangeable in grill 10. The interchangeability of heating plates 100, 200 is facilitated by the use of the release mechanisms incorporated into upper and lower housings 30, 50 so that a user can utilize grill 10 for a variety of different types of cooking.

The present invention contemplates the use of other types and configurations of heating plates and combinations of different types of heating plates, which have various types of surface geometries for various types of cooking, such as grilling, panini-grilling, griddling, toasting, waffleling, or the like cooking.

Figure 2:
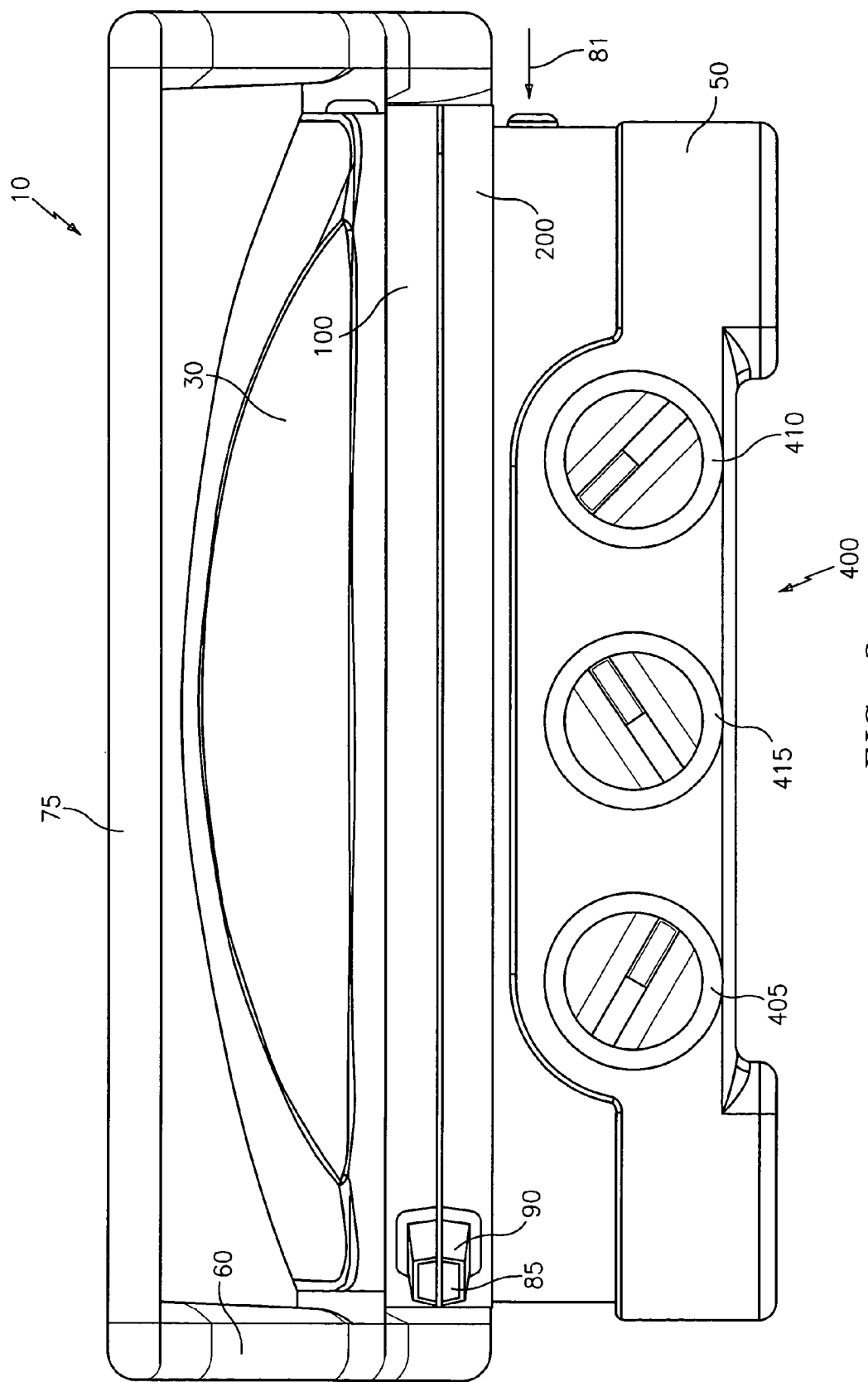
FIG. 2 is a front view of the grill of FIG. 1.
Figure 5:
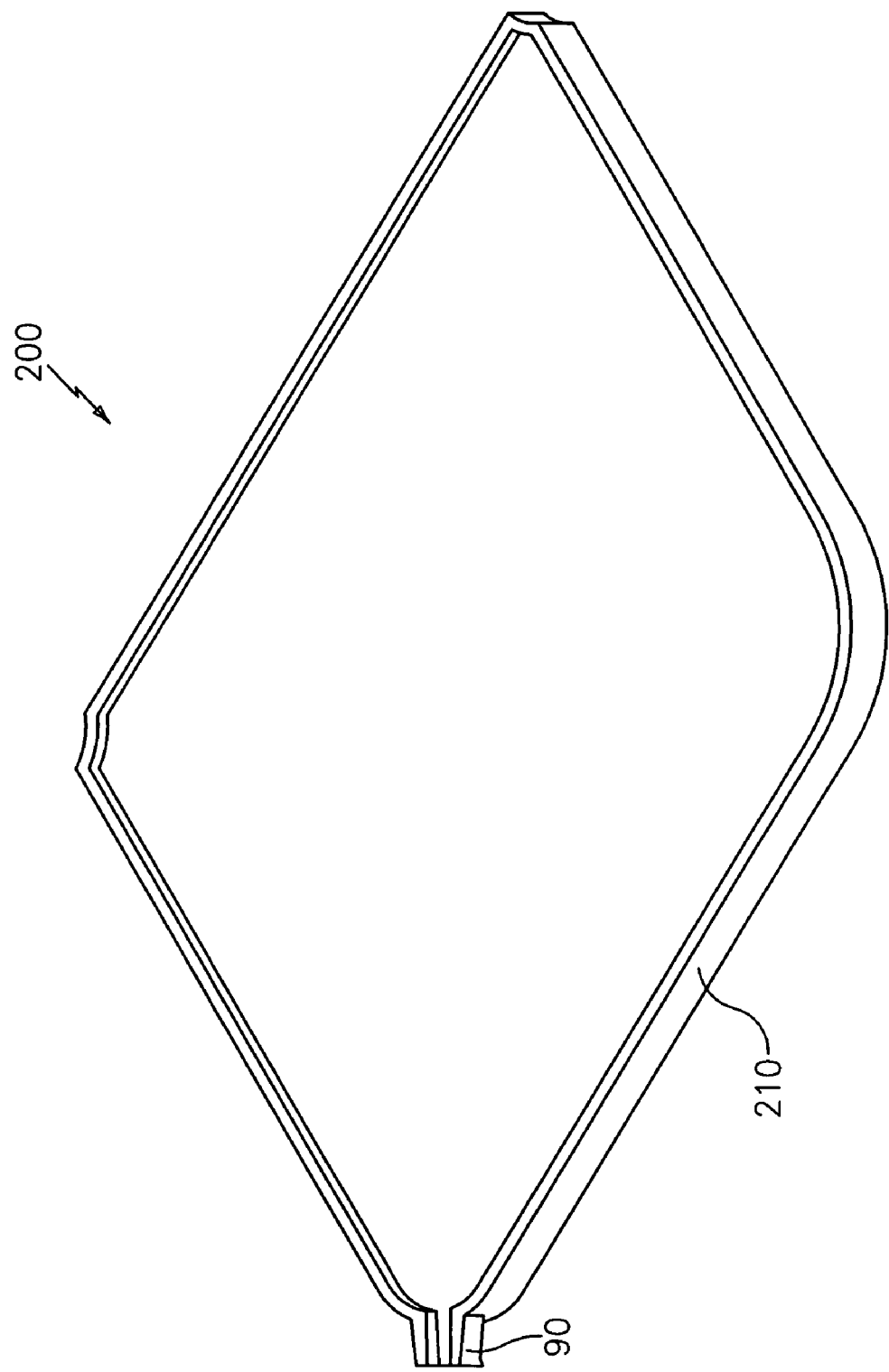
FIG. 5 is a top perspective view of a first heating plate in accordance with the present invention.
Figure 6:
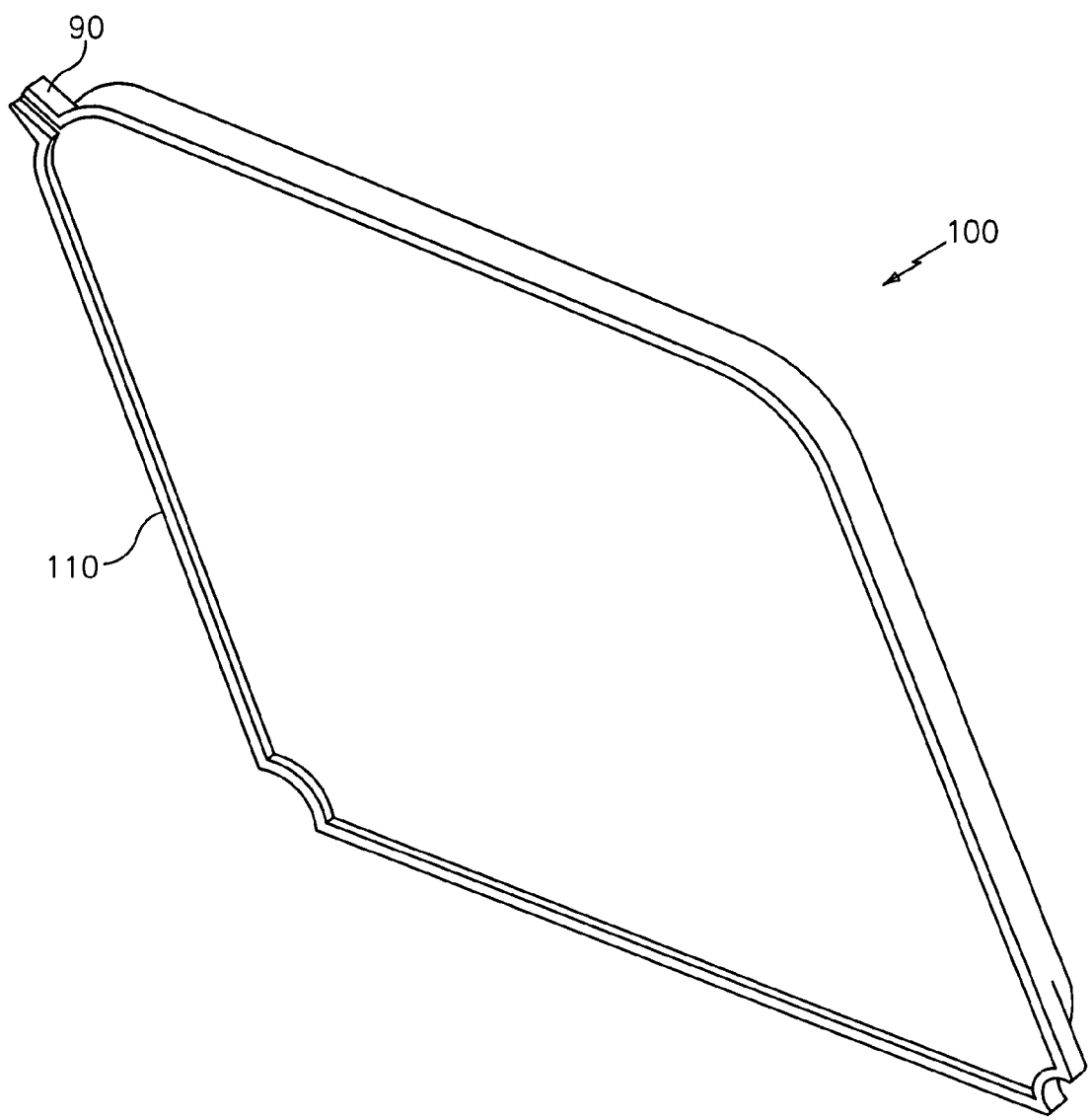
FIG. 6 is a bottom perspective view of a second heating plate in accordance with the present invention.
Figure 7:
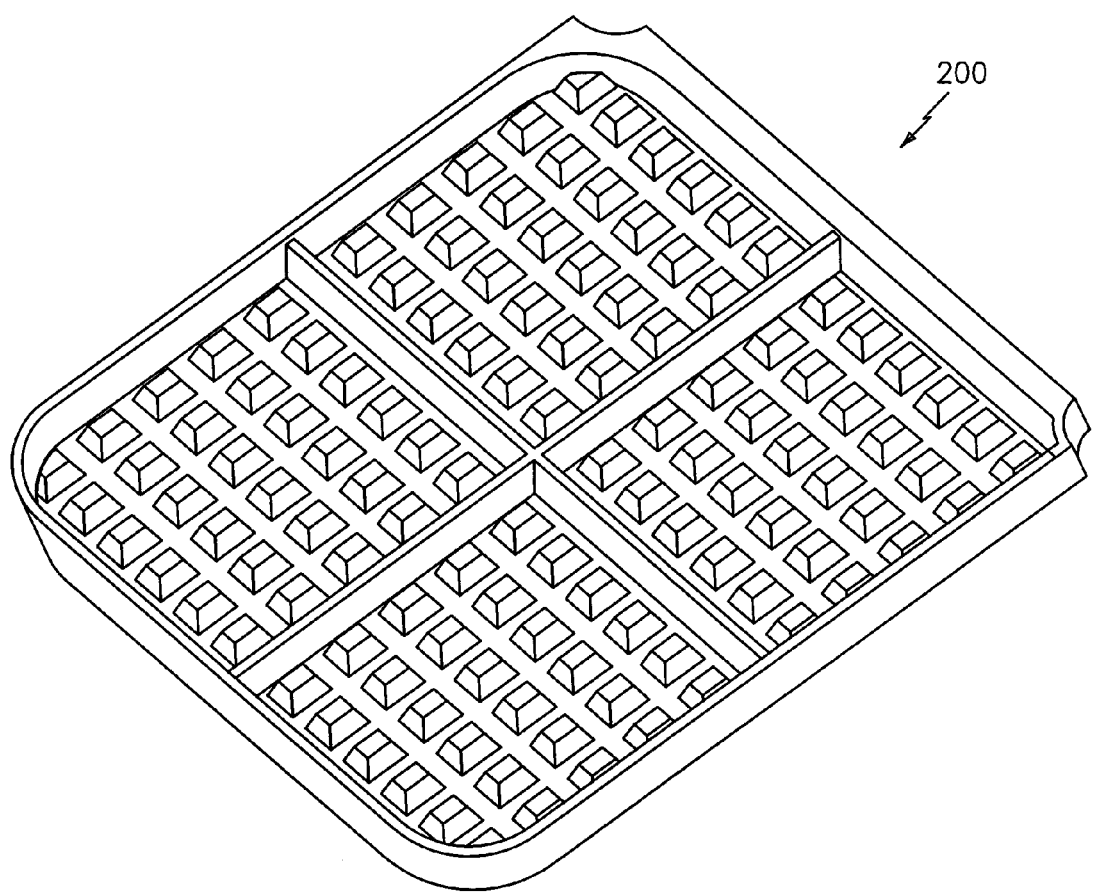
FIG. 7 is a top perspective view of a third heating plate in accordance with the present invention.
Figure 8:
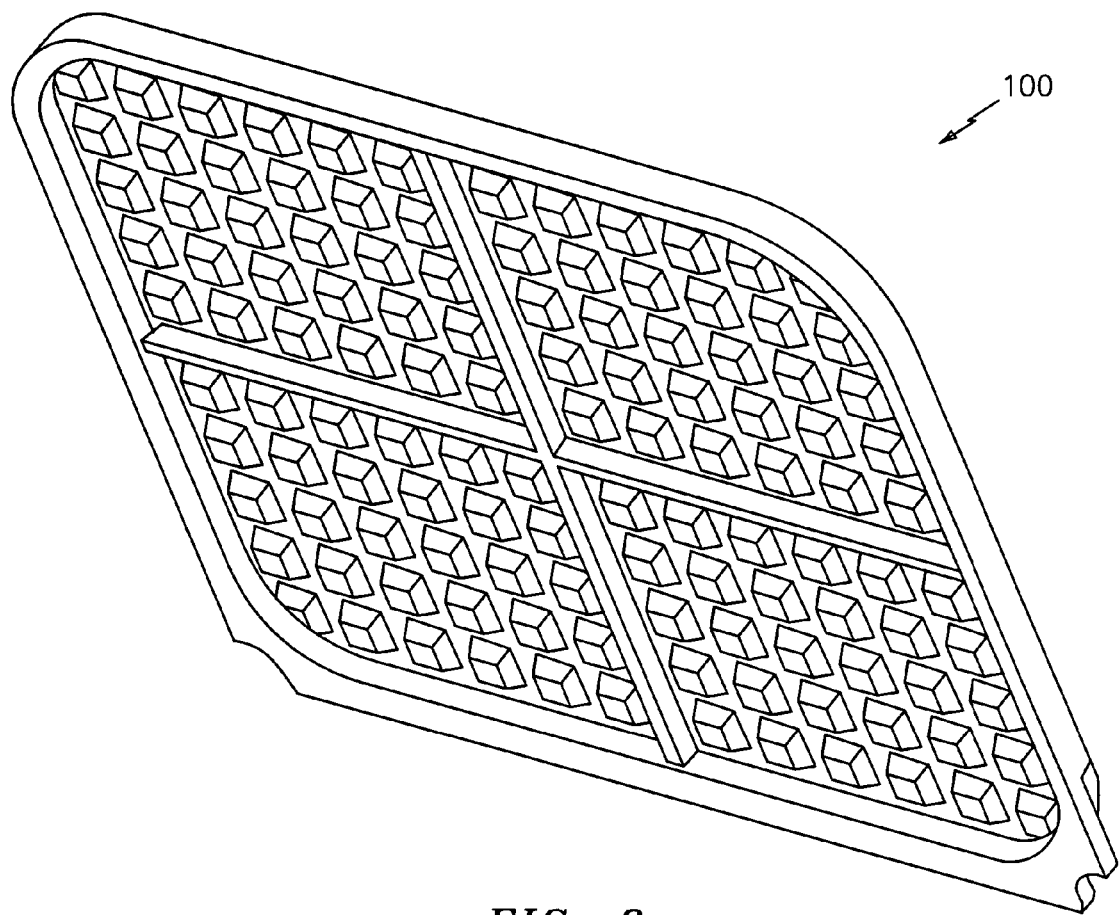
FIG. 8 is a bottom perspective view of a fourth heating plate in accordance with the present invention.

Referring to FIGS. 5 and 6, flat griddle heating plates 100, 200 include gutters 110, 210, respectively, along a periphery of the heating plates. The gutters collect cooking residue such as, for example, grease and debris. When upper and lower housings 30, 50 are brought together when grill 100 is closed, gutters 110, 210 are brought together to form a gutter channel 85. Gutter channel 85 is shown in FIGS. 1 and 2. Gutter channel 85 facilitates a flow of the cooking residue away from the cooking area of the heating plates.

Referring to FIG. 1, gutter channel 85, preferably, has a discharge point at spout 90. Spout 90 preferably extends from grill 10 and is formed from opposing portions of the heating plates 100, 200 along the periphery thereof. It is noted that more and/or alternative positioning of the gutters can be used.

Grill 10 can include a collector (not shown) in fluid communication with spout 90 and/or gutter channel 85 for collecting the cooking residue that flows through the gutter channel. The collector can include a disposable cartridge, or an analogous structure that facilitates quick and easy removal of the cooking residue from the collector. The collector can be a separate accessory for use with grill 10 or can be incorporated into the structure of upper and/or lower housings 30, 50.

Referring to FIG. 3, lower housing 50 preferably has a power cord assembly 95. Power cord assembly 95 provides an interface or connection point for a supply energy source to grill 10. Power cord assembly 95 can include, for example, a flexible cord connector, a retractable flexible cord, a detachable power cord connector, or any and other type of power interface connector.

Figure 9:
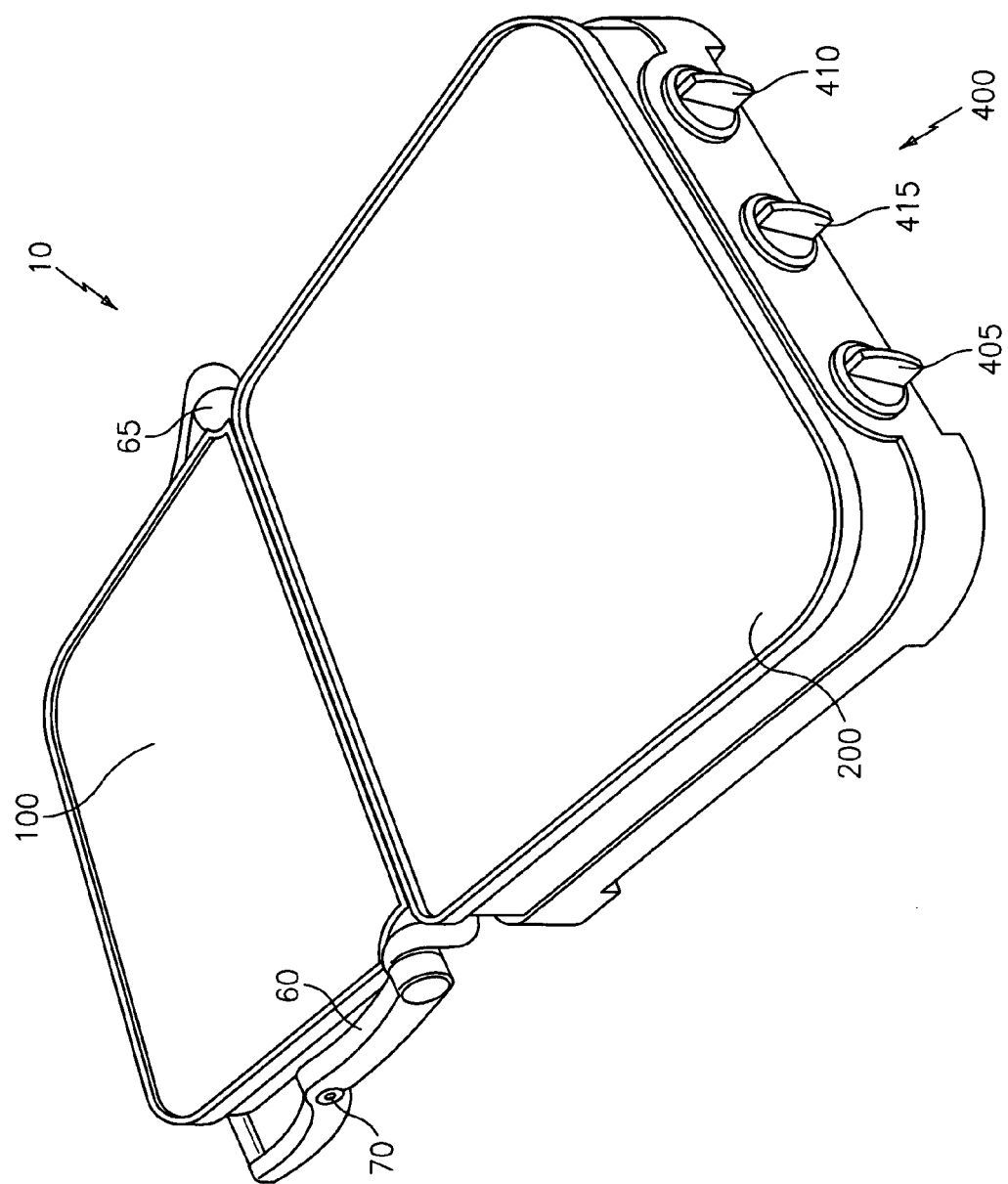
FIG. 9 is a top perspective view of the grill of FIG. 1 in a flat open position, including the heating plates of FIGS. 5 and 6.
Figure 10:
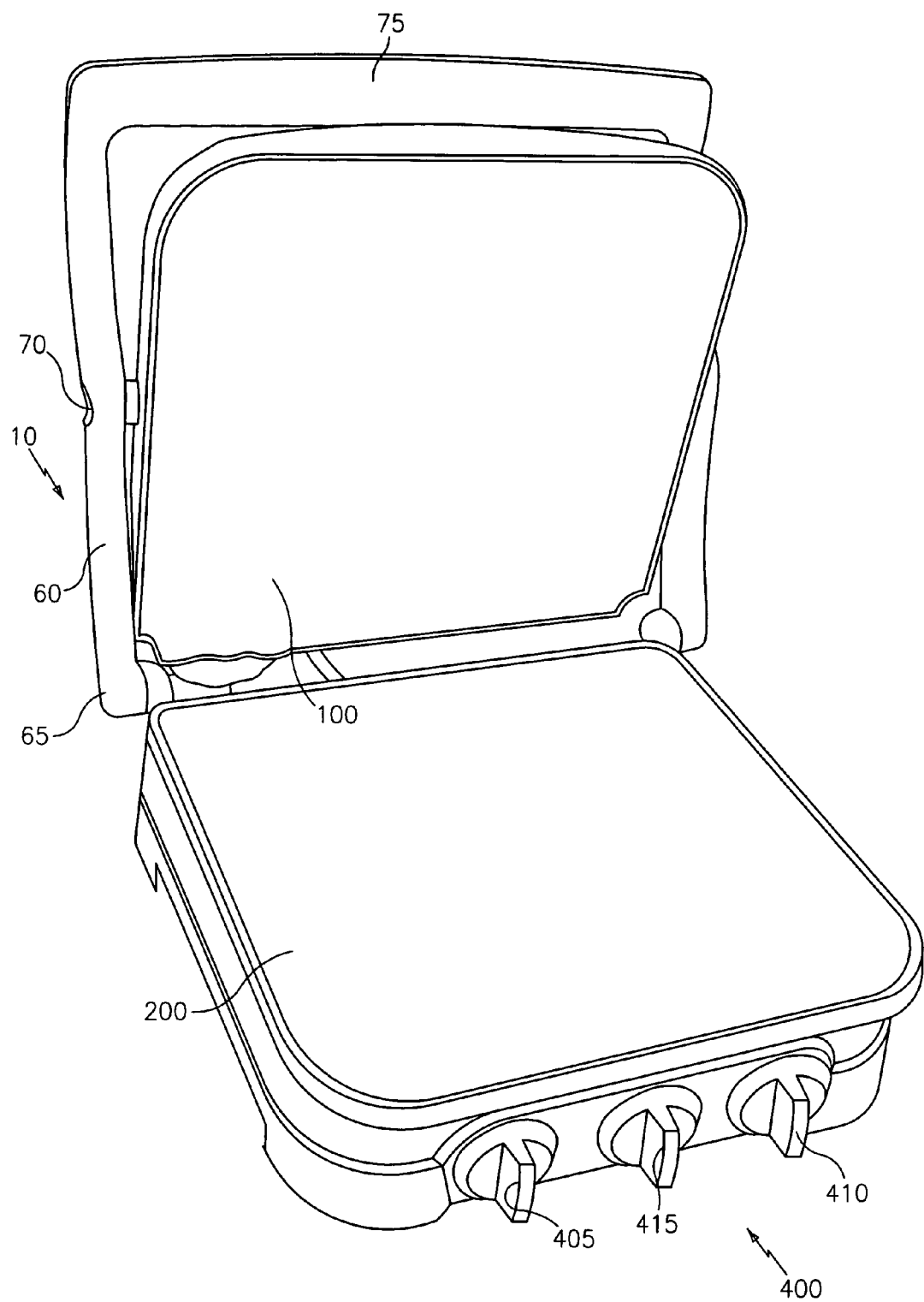
FIG. 10 is a top perspective view of the grill of FIG. 1 in an angled, open position with the heating plates of FIGS. 5 and 6.

Grill 10 can be used in, at least, a closed position as shown in FIG. 1 and a flat open position as shown in FIG. 9. The pivotal connection between upper and lower housings 30, 50 and securing arm 60 facilitates the multiple cooking positions provided by grill 10. In the flat open position, grill 10 presents a maximum of the available heating surface by positioning heating plates 100, 200 substantially adjacent to each other.

In one embodiment of the present invention, upper and lower housings 30, 50 can be, via securing arm 60, selectively positioned at any angle with respect to each other. For example, securing arm 60 can have a stop mechanism (not shown) for positioning upper housing 30 and/or the securing arm 60 at a 90 degree angle relative to each other.

Figure 11:
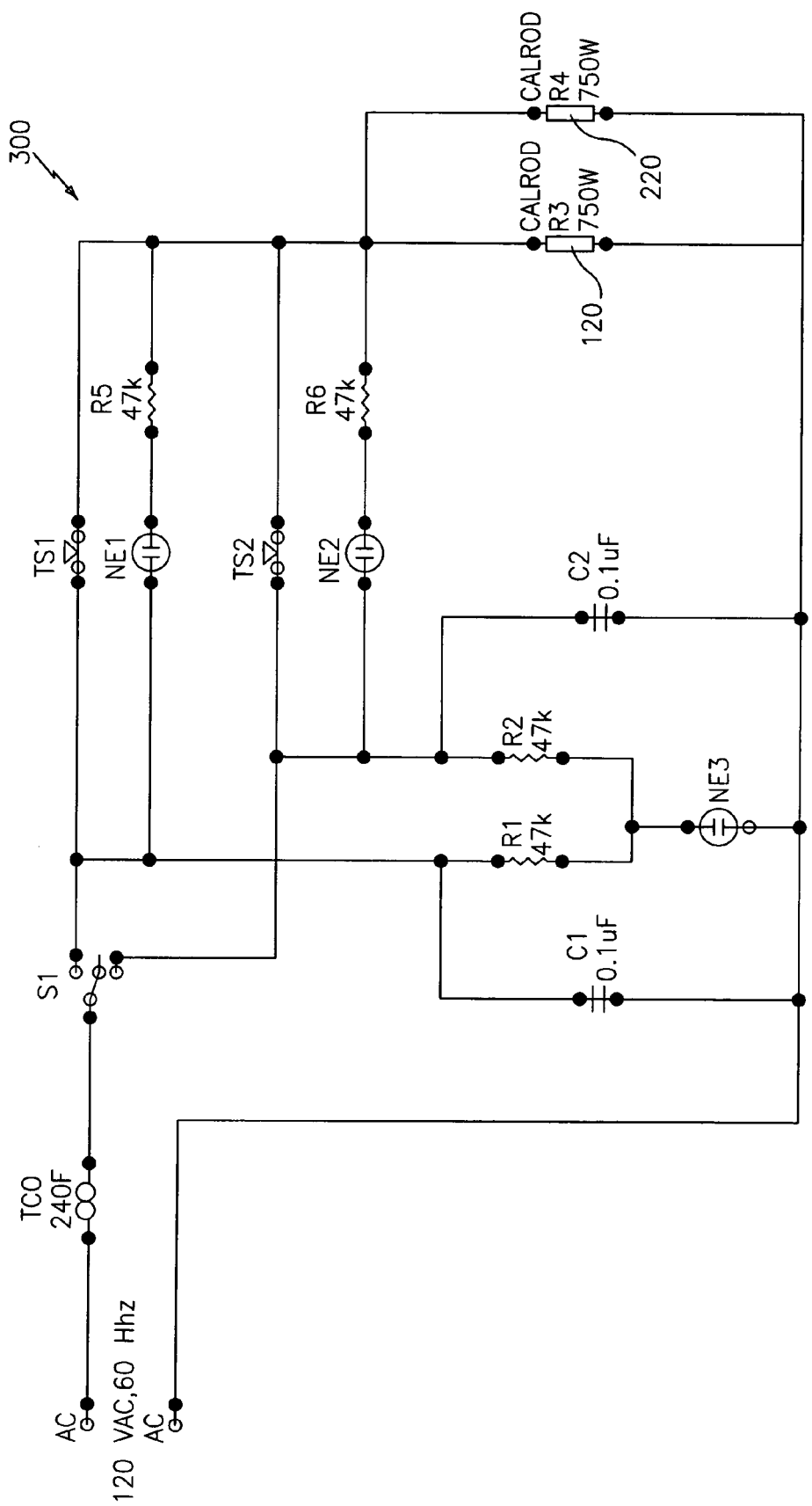
FIG. 11 is a schematic diagram of an exemplary circuit for the grill of FIG. 1.

Grill 10 heats heating plates 100, 200 using an electric circuit. A schematic diagram of an exemplary electric circuit 300 for heating the heating plates is shown in FIG. 11. Exemplary circuit 300 is not discussed in detail herein since the present invention contemplates that the electric circuit can be embodied in a variety and number of ways using a wide variety of components that are known to one skilled in the art.

Figure 12:
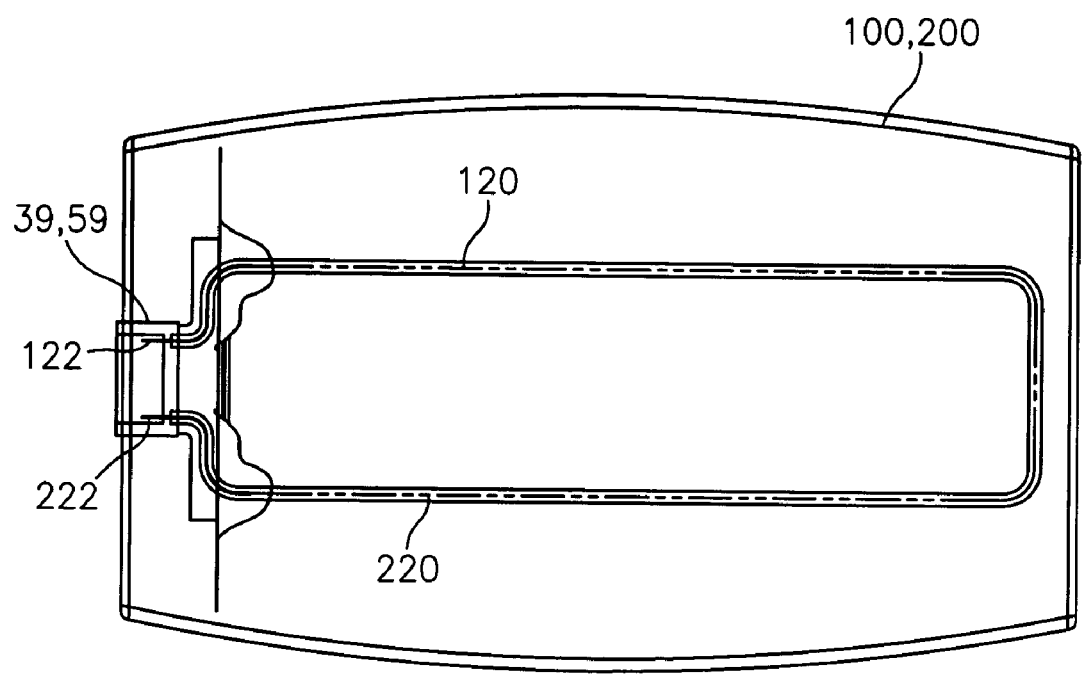
FIG. 12 is top section view of a heating plate in accordance with an alternative embodiment of the present invention.
Figure 13:
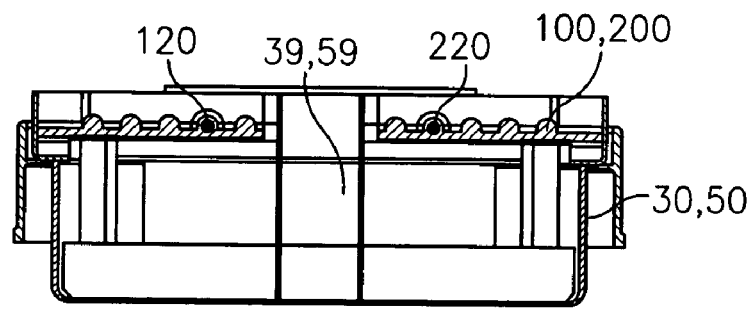
FIG. 13 is a side section view of the heating plate of FIG. 12, showing the heating plate connected to the grill of FIG. 1.

Referring to FIGS. 12 and 13, grill 10 preferably has heaters 120, 220 disposed in both upper housing 30 and lower housing 50. Heating plates 100, 200 preferably have undersurfaces with channels or heat transfer structures formed therein. The channels mate with the heaters 120, 220 to provide an increased contact surface area in order to maximize the heat transfer between the heaters and the heating plates 100, 200. Preferably, the channels substantially surround the heaters 120, 200. The channels assist in retaining the heaters in thermal contact with the heating plates 100, 200. The channels are preferably integrally formed with the undersurfaces of heating plates 100, 200. Thermal grease can be used with the channels and heaters 120, 220 to further maximize the transfer of heat between the heaters and the heating plates 100, 200.

While the present invention describes the channels as having a size and shape to allow for substantial mating with the heaters 120, 220, the channels or heat transfer structures can have other shapes that effectively increase the surface contact area between the heaters and the heating plates 100, 200 to increase the heat transfer therebetween.

Referring to FIG. 11, circuit 300 can include a dual thermostat configuration, TS1 and TS2. Circuit 300 can include other electrical components, such as, for example, an NTC, thermal switch, or a safety switch to prevent overheating, electric shock, or facilitate efficient operation and control of the grill 10. Heaters 120, 220 can be implemented in a variety of ways using a variety of components and methodologies. For example, heaters 120 and 220 can be implemented as cal rod heaters.

Figure 15:
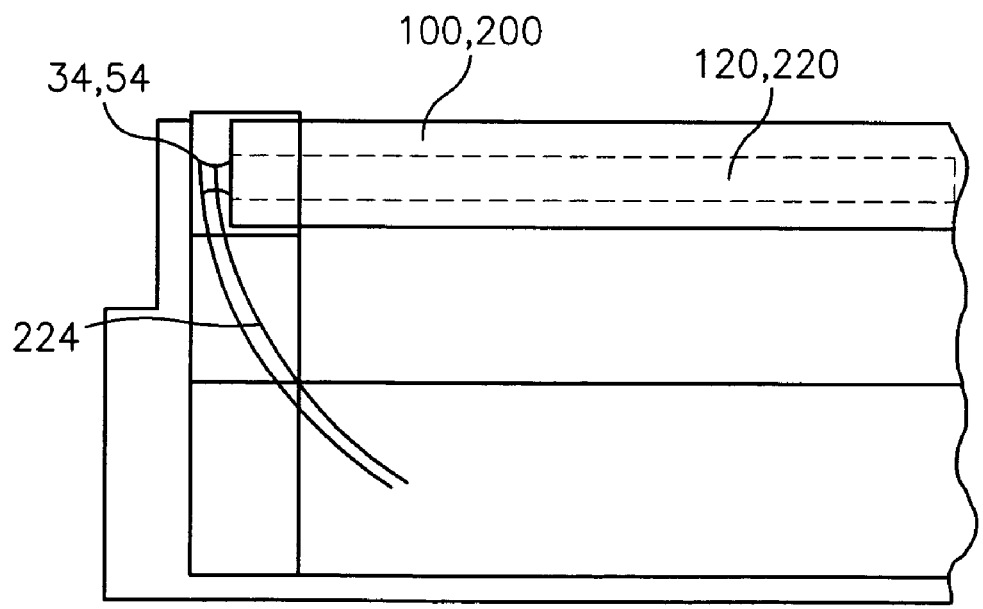
FIG. 15 is a detailed section view of an electrical connection between the heating plate of FIG. 12 and the grill of FIG. 1 in accordance with another embodiment of the present invention.

In another embodiment of the present invention, heaters 120, 220 may be cast or embedded directly into heating plates 100, 200, as shown in FIGS. 12 and 13. Heaters 120, 220 can be separably connected to circuit 300, via one or more conductive pins 122, 222 in heating plates 100, 200, as shown in FIG. 12. Conductive pins 122, 222 are preferably connectable to one or more terminals 34, 54 located at one end of each housing 30, 50, as shown in FIG. 15.

As best shown in FIGS. 1 and 2, a preferred embodiment includes rotary dial controls 400 disposed along a front portion of lower housing 50. Preferably, there are at least three controls 400. A first control 405 is a waffle control and can include multiple settings for cooking temperature, time, degree of cooking, or the like settings. A second control 410 is a preferably a grill or griddle control and can include multiple settings also for cooking temperature, time, degree of cooking, or the like settings. A third control 415 is preferably a master control located between the first and second controls 405, 410. Third or master control 415 includes multiple settings, such as, for example, waffle, grill, griddle, off, on, or the like type settings.

The first, second, and third controls preferably cooperate to control the cooking operation of grill 10. For example, in the instance third or master control 415 is set to a waffle setting (typically a type of cooking done at lower temperatures), first control 405 governs the various settings of grill 10. In the instance third or master control 415 is set to a grill setting (typically a type of cooking done at higher temperatures), the second control 410 governs the various settings of grill 10.

Alternative controls, displays, indicators, and user interfaces can be incorporated into grill 10, such as LED and/or LCD displays and interfaces. Grill 10 can provide a listing of representative indicia of the type of food and/or method of cooking that is to be done. The control dials can be used to selectively choose from the listed indicia to select the desired type food to be cooked and/or the method to use for cooking the food.

It should be understood that the foregoing description is only illustrative of the present invention. Various alternatives and modifications can be devised by those skilled in the art without departing from the present invention. Accordingly, the present invention is intended to embrace all such alternatives, modifications and variances.

What we claim is:

1. A grill comprising:
   an upper housing having a first heating plate removably connected thereto;
   a lower housing having a second heating plate removably connected thereto;
   an arm being connected to said upper housing at a first pivot point and said lower housing at a second pivot point; and
   a plurality of controls for controlling operation of said grill,
   wherein said plurality of controls includes a first control for controlling heating of said first and said second heating plates to a temperature in a first temperature range and wherein said plurality of controls includes a second control for controlling heating of said first and said second heating plates to a temperature in a second temperature range, wherein said second temperature range is greater than said first temperature range.

2. The grill of claim 1, wherein said upper housing rotates about said first pivot and said lower housing rotates about said second pivot point.

3. The grill of claim 1, wherein at least one of said first and said second pivot points is located at about a midpoint of a lateral side of said upper housing and said lower housing, respectively.

4. The grill of claim 1, further comprising a first heater for heating said first heating plate and a second heater for heating said second heating plate.

5. The grill of claim 4, wherein at least one of said first and said second heaters are embedded in said first and said second heating plates, respectively.

6. The grill of claim 4, wherein at least one of said first and said second heaters are encased in said first and said second heating plates, respectively.

7. The grill of claim 4, wherein at least one of said first heater and said second heater is in thermal contact with said first heating plate and said second heating plate, respectively.

8. The grill of claim 1, further comprising at least one gutter channel located on at least one of said first heating plate and said second heating plate.

9. The grill of claim 8, wherein said at least one gutter channel is located along at least a portion of a periphery of at least one of said first heating plate and said second heating plate.

10. The grill of claim 8, further comprising at least one spout for providing an outlet for cooking residue that flows in said at least one gutter channel located on at least one of said first heating plate and said second heating plate.

11. The grill of claim 1, further comprising a plurality of controls for controlling operation of said grill.

12. The grill of claim 11, wherein said plurality of controls includes a first control for controlling heating of said first and said second heating plates to a temperature in a first temperature range.

13. The grill of claim 1, wherein said plurality of controls includes a third control for controlling activation of said first control, said second control, and the grill.

14. The grill of claim 1, wherein said first and said second heating plates can be interchangeably replaced in said upper and said lower housings.

15. The grill of claim 1, further comprising at least one release mechanism for selectively connecting at least one of said first heating plate to said upper housing and said second heating plate to said lower housing, respectively.

16. The grill of claim 15, wherein said release mechanism is selected from a group consisting of a slide latch, a detent, a clip, and any combinations thereof.

17. The grill of claim 4, further comprising a channel on each of said first and said second heating plates for increasing a surface contact area between said first and said second heating plates and said first and said second heaters, respectively.

* * * * *